United States Patent
Paolini et al.

(10) Patent No.: US 10,556,672 B2
(45) Date of Patent: Feb. 11, 2020

(54) BASELESS VORTEX GENERATOR

(71) Applicant: Rohr, Inc., Chula Vista, CA (US)

(72) Inventors: Thomas Paolini, Santee, CA (US);
Nicholas Hedges, Carlsbad, CA (US)

(73) Assignee: Rohr, Inc., Chula Vista, CA (US)

( * ) Notice: Subject to any disclaimer, the term of this patent is extended or adjusted under 35 U.S.C. 154(b) by 329 days.

(21) Appl. No.: 15/682,910

(22) Filed: Aug. 22, 2017

(65) Prior Publication Data
US 2019/0061921 A1 Feb. 28, 2019

(51) Int. Cl.
| | |
|---|---|
| *B64C 23/06* | (2006.01) |
| *F42B 10/04* | (2006.01) |
| *F42B 10/44* | (2006.01) |
| *B64D 29/06* | (2006.01) |
| *F01D 25/24* | (2006.01) |
| *B64F 5/10* | (2017.01) |
| *F42B 10/38* | (2006.01) |
| *B64C 7/02* | (2006.01) |
| *B64D 29/02* | (2006.01) |
| *B64D 29/00* | (2006.01) |

(52) U.S. Cl.
CPC .............. *B64C 23/06* (2013.01); *B64D 29/06* (2013.01); *B64F 5/10* (2017.01); *F01D 25/24* (2013.01); *F42B 10/04* (2013.01); *F42B 10/38* (2013.01); *F42B 10/44* (2013.01); *B64C 7/02* (2013.01); *B64C 2230/26* (2013.01); *B64D 29/00* (2013.01); *B64D 29/02* (2013.01); *F05D 2240/127* (2013.01); *F05D 2240/14* (2013.01)

(58) Field of Classification Search
CPC .... B64C 1/36; B64C 1/38; B64C 3/58; B64C 23/06; B64C 2027/8272; F42B 10/04; F42B 10/06; F05D 2240/127
See application file for complete search history.

(56) References Cited

U.S. PATENT DOCUMENTS

| | | | |
|---|---|---|---|
| 2,690,315 A | 9/1954 | Todoroff | |
| 2,845,026 A * | 7/1958 | Smith | F42B 10/06 244/3.24 |
| 2,851,950 A | 9/1958 | Van Aken et al. | |
| 4,917,333 A | 4/1990 | Murri | |
| 5,158,509 A * | 10/1992 | Ebaugh | F42B 10/06 102/517 |
| 6,964,397 B2 | 11/2005 | Konings | |
| 7,410,120 B2 * | 8/2008 | Russom | B64C 1/26 244/131 |
| 9,040,886 B1 | 5/2015 | Hopping | |

(Continued)

FOREIGN PATENT DOCUMENTS

EP 2801521 11/2014

OTHER PUBLICATIONS

European Patent Office, European Search Report dated Nov. 12, 2018 in Application No. 18190321.2.

*Primary Examiner* — Nicholas McFall
(74) *Attorney, Agent, or Firm* — Snell & Wilmer, L.L.P.

(57) ABSTRACT

A strake may comprise a plate, wherein the plate extends between a forward end and an aft end along a first direction and the plate extends between a root end and a tip end along a second direction, a first tab extending from the root end of the plate, wherein a first fastening aperture is disposed in the first tab, and a second tab extending from the root end of the plate, wherein a second fastening aperture is disposed in the second tab.

14 Claims, 9 Drawing Sheets

(56) References Cited

U.S. PATENT DOCUMENTS

| | | |
|---|---|---|
| 9,309,903 B2 | 4/2016 | Clingman et al. |
| 2011/0210200 A1 | 9/2011 | Russom |
| 2016/0083083 A1 | 3/2016 | Bordoley et al. |
| 2016/0243806 A1 | 8/2016 | Frost |
| 2016/0311524 A1 | 10/2016 | Hutcheson et al. |

* cited by examiner

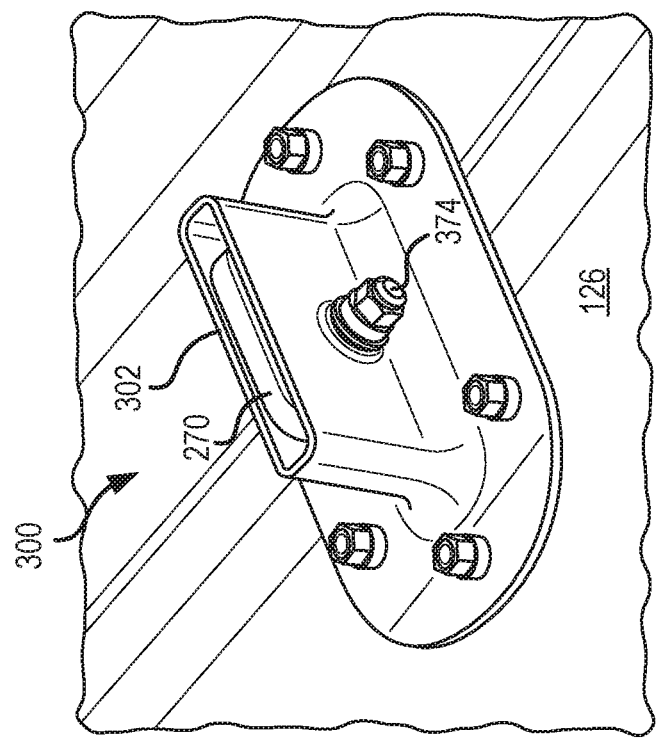
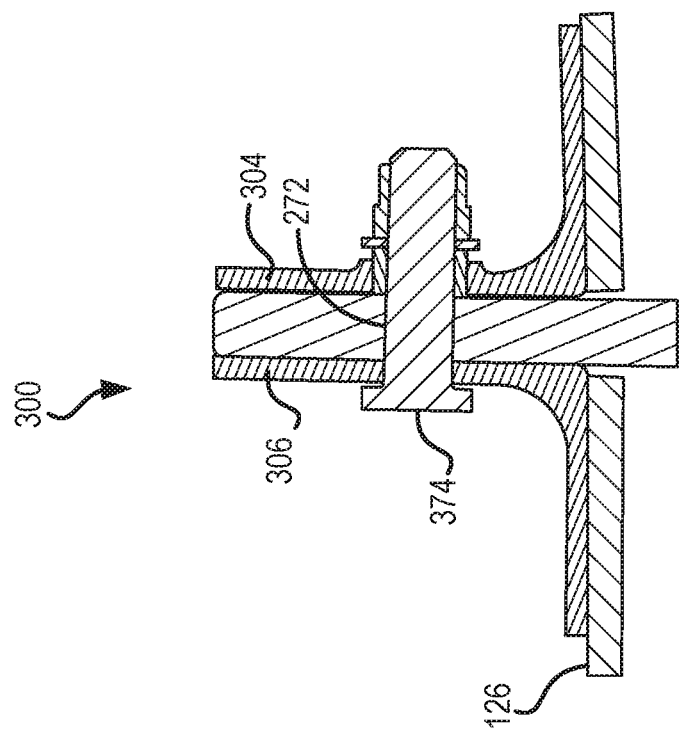
FIG. 3B
FIG. 3A

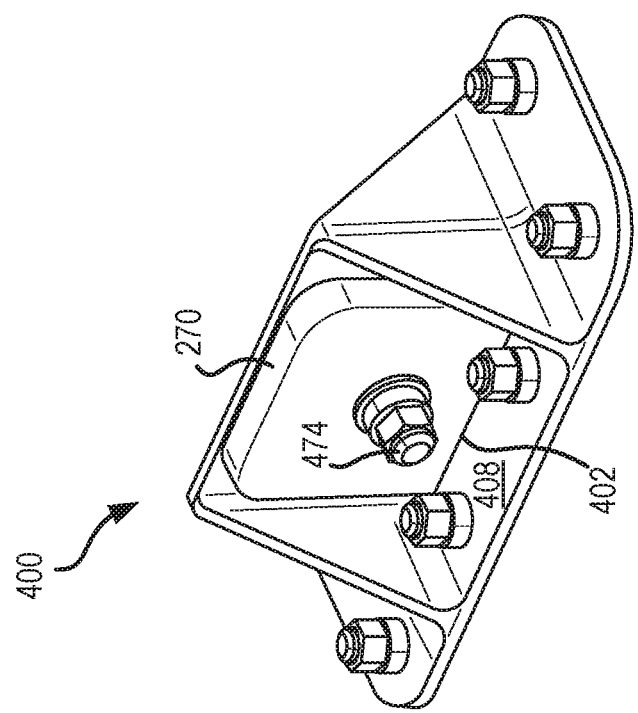
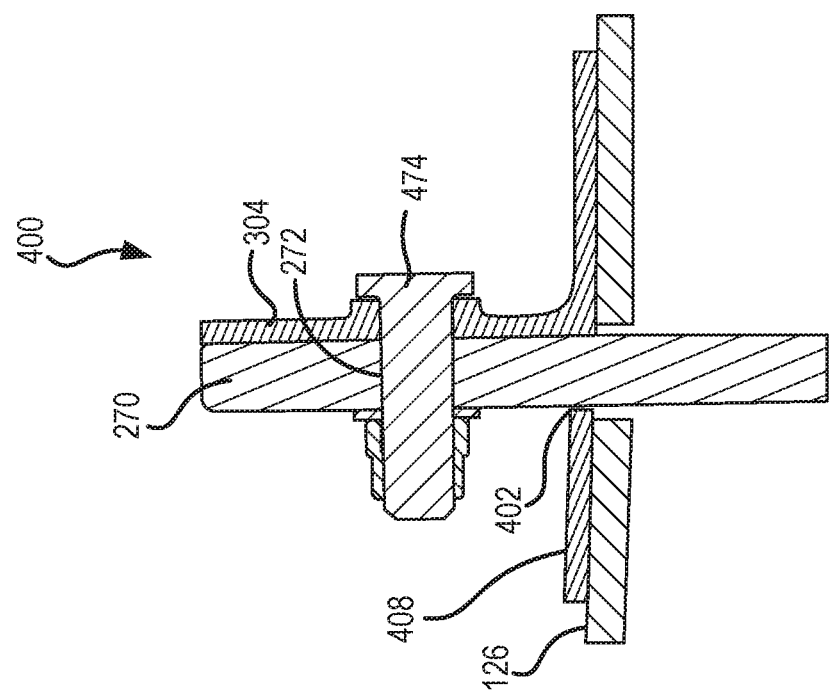

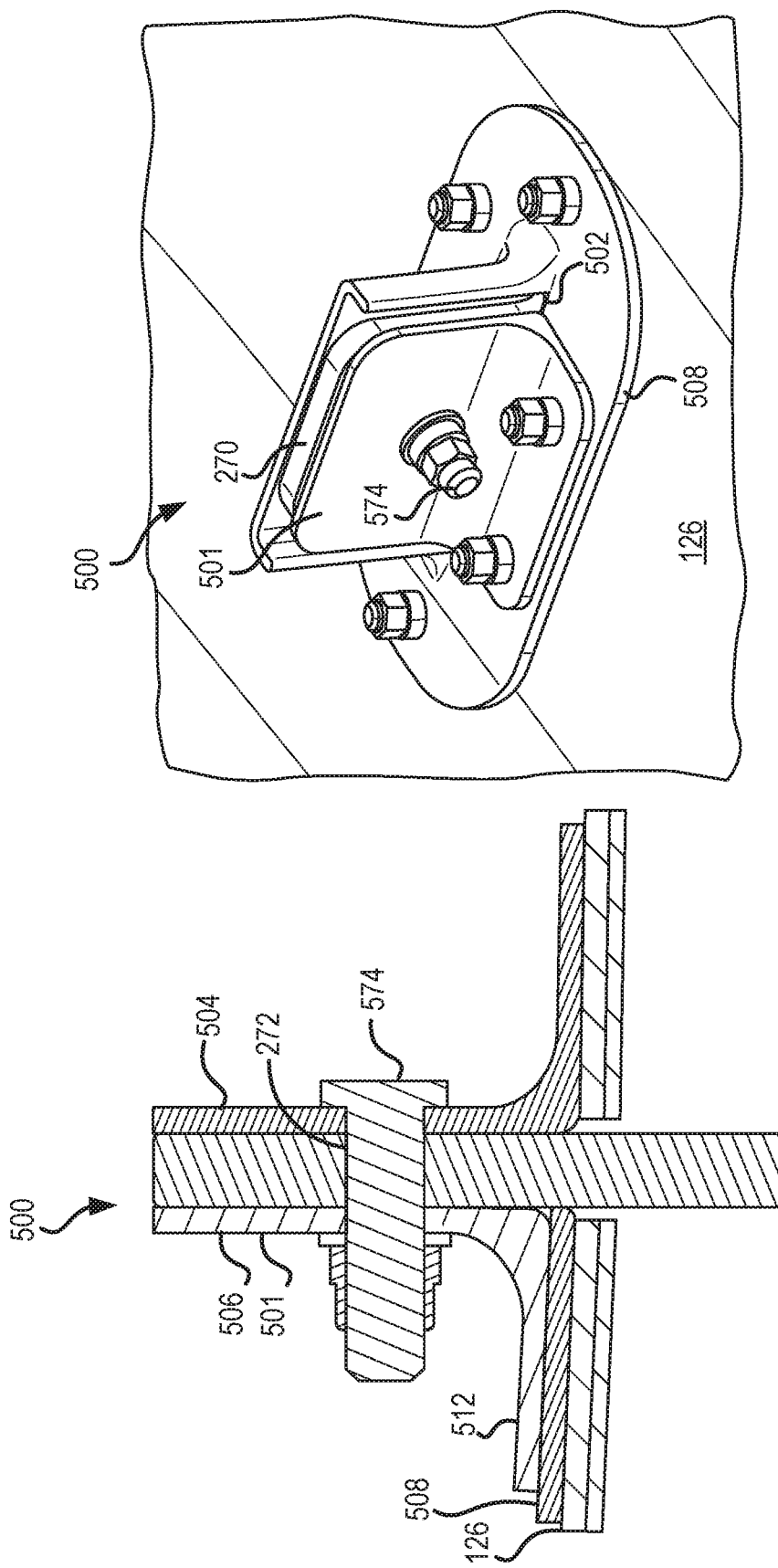

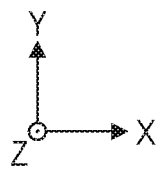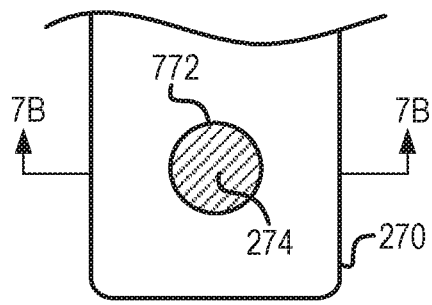
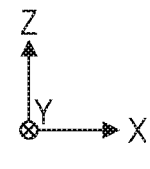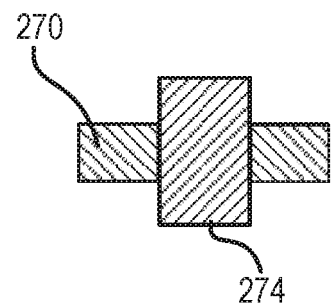
FIG. 7A                FIG. 7B
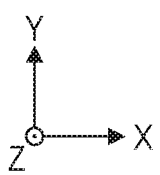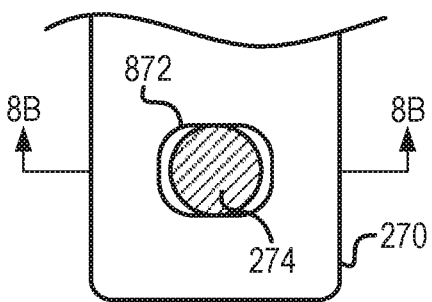
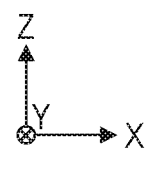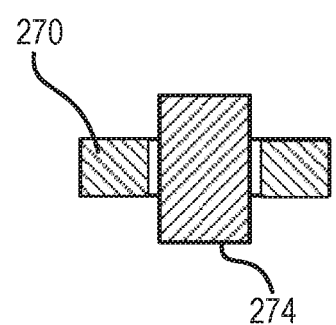
FIG. 8A                FIG. 8B

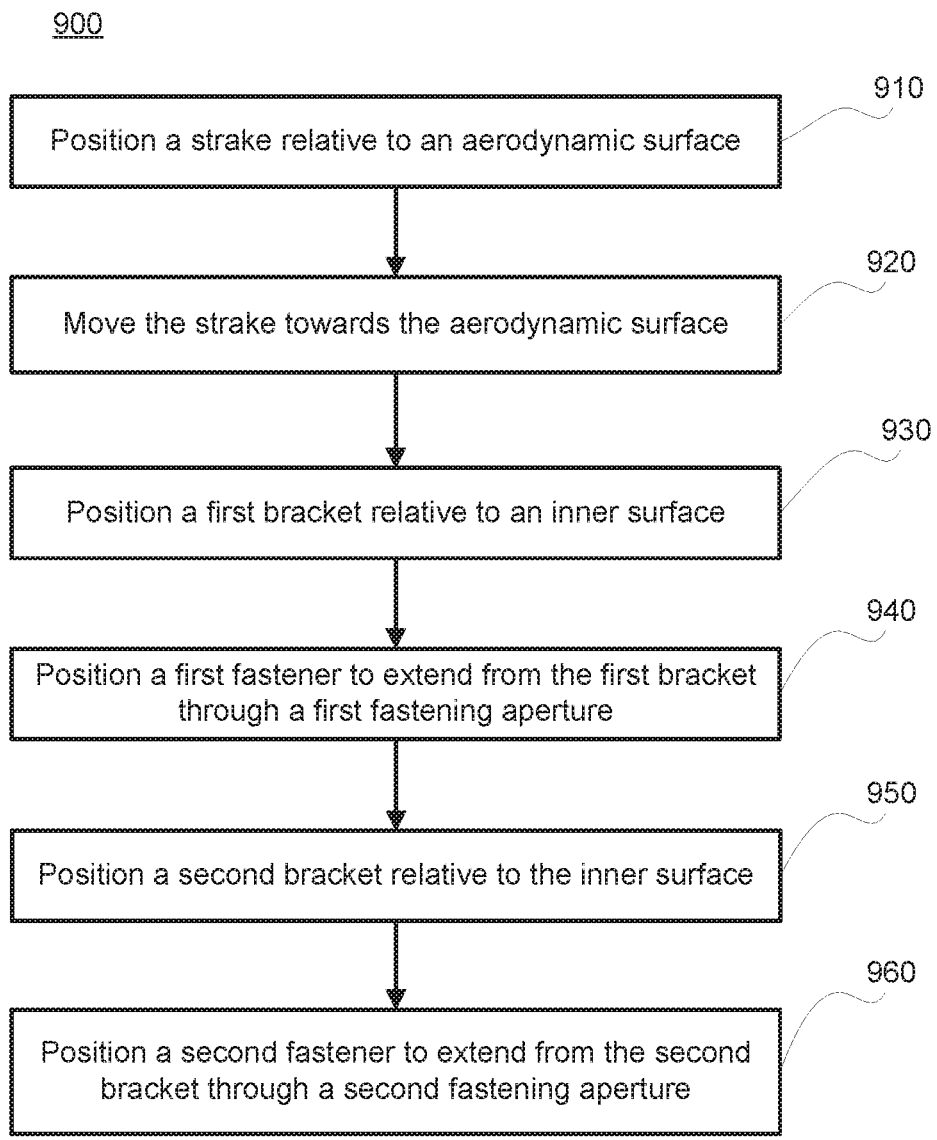

BASELESS VORTEX GENERATOR

FIELD

The present disclosure relates generally to aerodynamic structures for use with aircraft and, more particularly to vortex generators.

BACKGROUND

On certain aircraft such as commercial airliners, tankers, airlifters, and transport aircraft, aircraft engines are typically mounted in nacelles that extend from pylons under the wing or that are mounted to the fuselage of the aircraft. In many aircraft, the leading edge of the engine nacelle is positioned forward of the wing leading edge. At high angles of attack, the engine nacelle sheds a wake. For aircraft where the engine nacelles are mounted in close proximity to the wing, the nacelle wake may flow over the wing leading edge and along the upper wing surface. Although the nacelle wake can be aerodynamically favorable under certain flight conditions, at high angles of attack close to the stalling angle where maximum lift is typically achieved, the nacelle wake can cause flow separation along the upper surface of the wing. Such flow separation may result in a reduction in the amount of lift that is producible by the wing in comparison to what might be achievable absent the nacelle wake.

Aircraft manufacturers have addressed the above-described flow separation phenomenon by installing various vortex-generating devices such as strakes (sometimes referred to as "chines") on the outer surface of the engine nacelle. The strake is typically mounted on a side of the engine nacelle and is sized and positioned to control the separation of the nacelle wake by generating a vortex that interacts beneficially with the wing upper surface boundary layer in order to reduce flow separation.

SUMMARY

A strake is disclosed herein, in accordance with various embodiments. A strake may comprise a plate, wherein the plate extends between a forward end and an aft end along a first direction and the plate extends between a root end and a tip end along a second direction, a first tab extending from the root end of the plate, wherein a first fastening aperture is disposed in the first tab, and a second tab extending from the root end of the plate, wherein a second fastening aperture is disposed in the second tab.

In various embodiments, the plate may comprise a thickness, measured along a third direction. The first direction may be orthogonal to the second direction and the third direction is orthogonal to the second direction. The first tab may extend in the second direction and the second tab extends in the second direction. A first centerline of the first fastening aperture may extend in the third direction and a second centerline of the second fastening aperture may extend in the third direction. The strake may be tapered from the aft end towards the forward end. A planar surface may extend between the forward end, the aft end, the root end, and the tip end. The second fastening aperture may comprise a slotted fastening aperture configured to allow a fastener to move relative to the first fastening aperture.

A vortex-generating arrangement is disclosed herein, in accordance with various embodiments. A vortex-generating arrangement may comprise an aerodynamic surface, an inner surface disposed inward from the aerodynamic surface, a first slot disposed in the aerodynamic surface and extending between the aerodynamic surface and the inner surface, a second slot disposed in the aerodynamic surface and extending between the aerodynamic surface and the inner surface, and a strake comprising a first tab extending through the first slot, and a second tab extending through the second slot.

In various embodiments, the vortex-generating arrangement may further comprise a first bracket coupled to the inner surface and a second bracket coupled to the inner surface, wherein the first tab is retained within the first slot via the first bracket, and the second tab is retained within the second slot via the second bracket. The strake may further comprise a plate, wherein the first tab extends from the plate and a first fastening aperture is disposed in the first tab, and the second tab extends from the plate and a second fastening aperture is disposed in the second tab. The plate may extend between a forward end and an aft end along a first direction. The plate may extend between a root end and a tip end along a second direction. The plate may comprise a thickness, measured along a third direction. The first direction may be orthogonal to the second direction and the third direction may be orthogonal to the second direction. The first tab may extend in the second direction and the second tab may extend in the second direction. A first centerline of the first fastening aperture may extend in the third direction and a second centerline of the second fastening aperture may extend in the third direction. The vortex-generating arrangement may further comprise a first fastener extending from the first bracket and through the first fastening aperture and a second fastener extending from the second bracket and through the second fastening aperture. A planar surface may extend between the forward end, the aft end, the root end, and the tip end. The second fastening aperture may comprise a slotted fastening aperture configured to allow a fastener to move relative to the first fastening aperture.

A method of installing a strake is disclosed herein, in accordance with various embodiments. A method of installing a strake may comprise: positioning the strake relative to an aerodynamic surface; moving the strake towards the aerodynamic surface, wherein a first tab and a second tab of the strake are inserted into, respectively, a first slot and a second slot disposed in the aerodynamic surface in response to the moving; positioning a first bracket relative to an inner surface; positioning a first fastener to extend from the first bracket through a first fastening aperture disposed in the first tab; positioning a second bracket relative to the inner surface; and positioning a second fastener to extend from the second bracket through a second fastening aperture disposed in the second tab.

In various embodiments, the method may further comprise coupling the first bracket to the inner surface.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 3A and FIG. 3B illustrate a bracket having two sidewalls for a vortex-generating arrangement, in accordance with various embodiments;

FIG. 4A and FIG. 4B illustrate a bracket having one sidewall for a vortex-generating arrangement, in accordance with various embodiments;

FIG. 5A and FIG. 5B illustrate a two-piece bracket for a vortex-generating arrangement, in accordance with various embodiments;

FIG. 7A and FIG. 7B illustrate a fastener positioned within a fastening aperture for a tab of a strake, in accordance with various embodiments; and FIG. 8A and FIG. 8B illustrate a fastener positioned within a slotted fastening aperture for a tab of a strake, in accordance with various embodiments; and FIG. 9 illustrates a method for installing a strake, in accordance with various embodiments.

DETAILED DESCRIPTION

Figure 1:
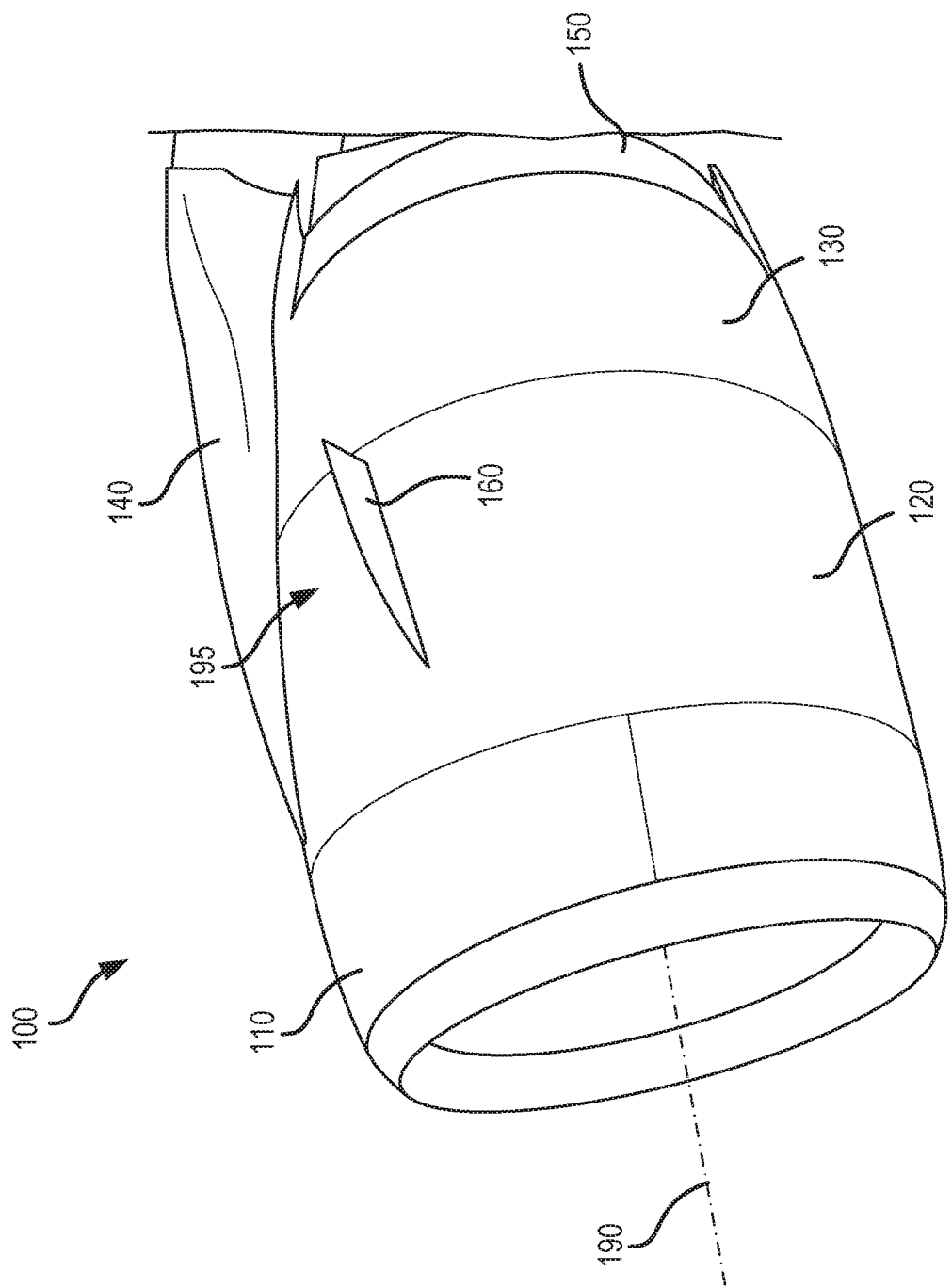
FIG. 1 illustrates a perspective view of an aircraft nacelle with a strake, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

A nacelle for a turbine engine typically includes an inlet section, a fan cowl section, a thrust reverser section, and an exhaust section. The nacelle is typically mounted to a wing or a fuselage of an aircraft via a pylon. The fan cowl section is typically split into two halves comprising fan cowls. A strake may be attached to one or both halves of the nacelle for generating vortices at high angles of attack to lower aircraft stall speed. Typically, a strake comprises a "T" shape having a base formed to conform with a lofted surface of the nacelle. In this regard, each strake may not be interchangeable between nacelle halves or between other parts of the aircraft because of the lofted shape of the base being formed for a particular location. Furthermore, the base may add drag, cost, and weight to the nacelle.

The baseless strake of the present application may be interchangeable between various locations of a nacelle or aircraft, allowing for a single part to be utilized for various locations of the nacelle or aircraft. Furthermore, in various embodiments, the baseless strake, as disclosed herein, may allow the strake to thermally grow and/or contract relative to a mounting surface. In this regard, the mounting surface and the strake may comprise different coefficients of thermal expansion (CTE) and may be allowed to expand and/or contract relative to each other. Furthermore, in various embodiments, the baseless strake, as disclosed herein, may cause less drag to the aircraft compared to strakes having more complex geometries. Furthermore, in various embodiments, the planar geometry of the baseless strake, as disclosed herein, may allow more simplified manufacturing of the baseless strake. Although described herein with respect to a nacelle, it is contemplated herein that a baseless strake may be used on various other portions of an aircraft, such as a wing, tail, or fuselage for example.

With reference to FIG. 1, an aircraft member, illustrated as a nacelle 100 for a gas turbine engine, is illustrated according to various embodiments. Nacelle 100 may be suitable for an aircraft. Nacelle 100 may comprise a centerline 190. Nacelle 100 may comprise an inlet 110, a fan cowl 120, and a thrust reverser 130. Fan cowl 120 may comprise two halves pivotally mounted to a pylon 140. In various embodiments, an exhaust nozzle 150 may extend from a turbine engine mounted within nacelle 100. Nacelle 100 may be coupled to pylon 140, which may mount the nacelle 100 to an aircraft wing or aircraft body. Nacelle 100 may comprise a vortex-generating arrangement 195. Vortex-generating arrangement 195 may comprise strake 160. Strake 160 may extend radially outward, with respect to centerline 190, from nacelle 100. Strake 160 may be configured to generate vortices at operational angles of attack, such as takeoff, climbing, level flight, and other situations, to lower aircraft stall speed. In various embodiments, strake 160 may be configured to reduce drag of an aircraft at an operational angle of attack. In this regard, strake 160 may be configured to reduce drag by redirecting at least a portion of fluid flow proximate an aircraft assembly, such as nacelle 100 for example.

Figure 2A:
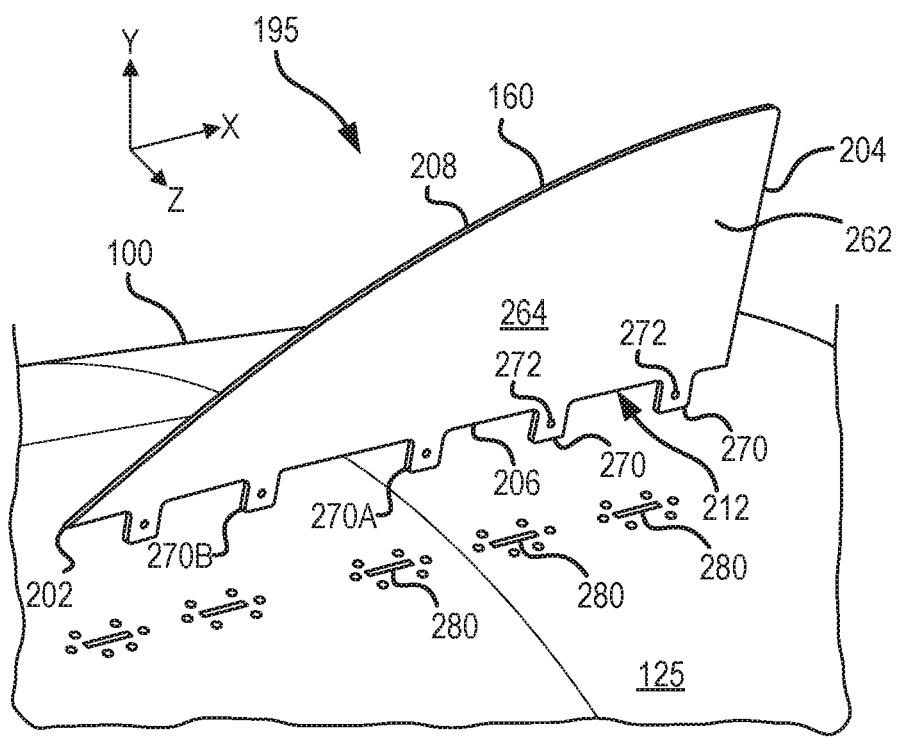
FIG. 2A illustrates a perspective outer view of a strake positioned relative to an aerodynamic surface, in accordance with various embodiments.

With reference to FIG. 2A, an outer view of vortex-generating arrangement 195 is illustrated, in accordance with various embodiments. FIG. 2A illustrates strake 160 relative to nacelle 100 before installation, in accordance with various embodiments. Vortex-generating arrangement 195 may comprise an aerodynamic surface 125. Aerodynamic surface 125 may be an outer surface of nacelle 100. However, it is contemplated herein, that vortex-generating arrangement 195 may comprise an aerodynamic surface 125 for any suitable aircraft member, such as a wing, fuselage, or tail, for example. Strake 160 may be formed as a plate 262 having a forward end 202, an aft end 204, a root end 206, and a tip end 208. Plate 262 may extend between forward end 202 and aft end 204 along a first direction (i.e., the X-direction). Plate 262 may extend between root end 206 and tip end 208 along a second direction (i.e., the Y-direction). Plate 262 may comprise a thickness measured along a third direction (i.e., the Z-direction). Plate 262 may comprise a constant thickness (measured in the Z-direction). Root end 206 may extend between forward end 202 and aft end 204. Tip end 208 may extend between forward end 202 and aft end 204. Root end 206 and tip end 208 may be located on opposite sides of strake 160. Root end 206 may interface aerodynamic surface 125. Plate 262 may have one or more tabs 270 extending from plate 262. Plate 262 may comprise a planar surface 264 with tabs 270 extending parallel to planar surface 264. Planar surface 264 may be an aerodynamic surface. Tabs 270 may extend from root end 206. Root end 206 may comprise a recess 212 interposed between each of the tabs 270. Tabs 270 may be disposed between forward side 202 and aft side 204 along root end 206. Strake 160 may be tapered from aft side 204 towards forward side 202 (in the Y-direction). In this regard, tip end 208 may comprise a lofted, or curved, surface.

In various embodiments, a fastening aperture 272 may be disposed in each tab 270. Fastening aperture 272 may be configured to receive a fastener for retaining strake 160 to nacelle 100. Fastening aperture 272 may extend normal to planar surface 264. That is to say that a centerline of fastening aperture 272 may extend along the third direction (i.e., the Z-direction).

In various embodiments, nacelle 100 may comprise one or more slots 280 configured to receive tabs 270. The geometry of slots 280 may be complimentary to the geometry of tabs 270.

In various embodiments, strake 160 may be composite, plastic, or metallic. In various embodiments, strake 160 may be formed using a composite layup process. In various embodiments, strake 160 may be formed using an injection molding process. In various embodiments, strake 160 may be formed from a metallic plate.

Figure 2B:
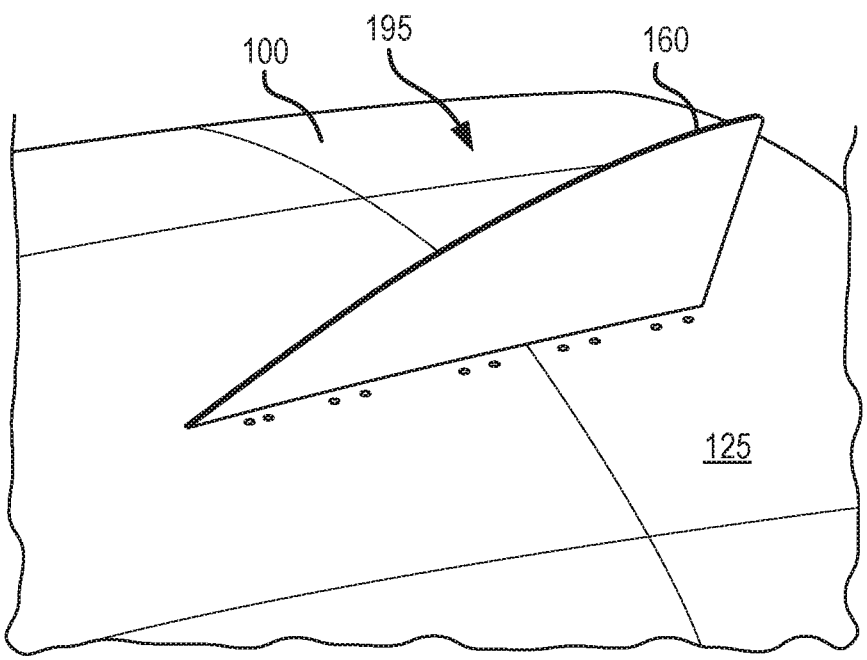
FIG. 2B illustrates a perspective outer view of the strake of FIG. 2A in an installed position, in accordance with various embodiments.

With reference to FIG. 2B, an outer view of vortex-generating arrangement 195 is illustrated with strake 160 in an installed position, in accordance with various embodiments. Tabs 270 (see FIG. 2A) may be located inward from aerodynamic surface 125 when strake 160 is in the installed position.

Figure 2C:
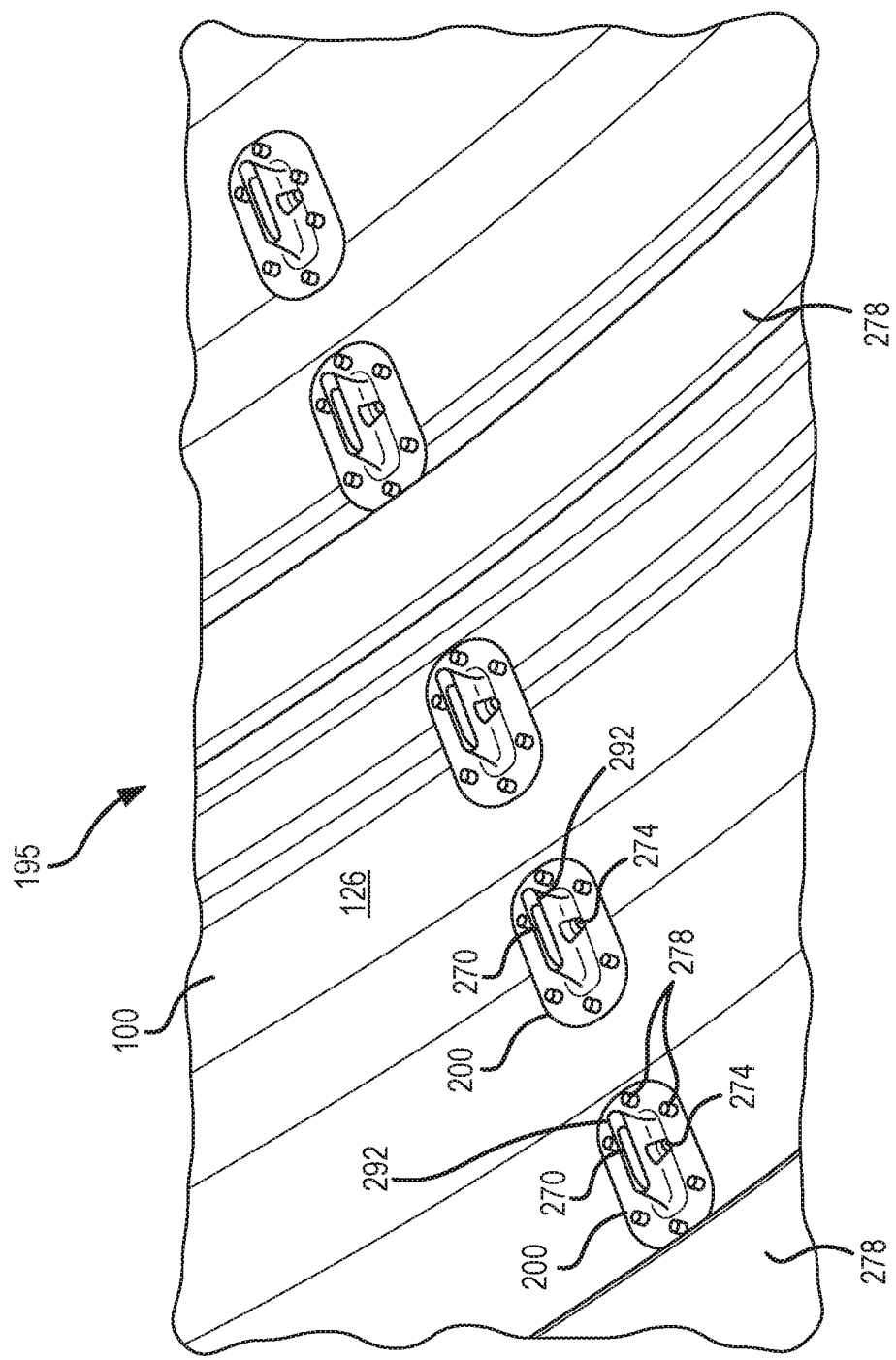
FIG. 2C illustrates a perspective inner view of the strake of FIG. 2B, in accordance with various embodiments.

With reference to FIG. 2C, an inner view of vortex-generating arrangement 195 is illustrated with strake 160 (see FIG. 2B) in the installed position, in accordance with various embodiments. Vortex-generating arrangement 195 may comprise an inner surface 126. Inner surface 126 may be an inner surface of nacelle 100. However, it is contemplated herein that vortex-generating arrangement 195 may comprise an inner surface 126 for any suitable aircraft member, such as a wing, fuselage, or tail, for example. Vortex-generating arrangement 195 may comprise one or more brackets 200. Each bracket 200 may be coupled to a respective tab 270. Each Bracket 200 may receive each respective tab 270 in a receiving aperture 292. Each bracket 200 may be coupled between inner surface 126 and tab 270. Bracket 200 may retain strake 160 to nacelle 100. Each bracket 200 may retain each tab 270 within each bracket's 200 respective slot 280. Bracket 200 may be disposed inward from aerodynamic surface 125, with momentary reference to FIG. 2B. With combined reference to FIG. 2A and FIG. 2C, a fastener 274 may extend through each fastening aperture 272 to retain tab 270 to bracket 200. In various embodiments, bracket 200 may be coupled to nacelle 100 via a plurality of fasteners 278.

With respect to FIG. 3A and FIG. 3B, elements with like element numbering, as depicted in FIG. 2A, are intended to be the same and will not necessarily be repeated for the sake of clarity.

With reference to FIG. 3A and FIG. 3B, a bracket 300 is illustrated, in accordance with various embodiments. In various embodiments, bracket 200 of FIG. 2C may be similar to bracket 300. Bracket 300 may be a single-piece bracket having a receiving aperture 302 defined by a first sidewall 304 and a second sidewall 306. A fastener 374 may extend between the first sidewall 304 and the second sidewall 306 and through fastening aperture 272.

With respect to FIG. 4A and FIG. 4B, elements with like element numbering, as depicted in FIG. 2A, are intended to be the same and will not necessarily be repeated for the sake of clarity.

With reference to FIG. 4A and FIG. 4B, a bracket 400 is illustrated, in accordance with various embodiments. In various embodiments, bracket 200 of FIG. 2C may be similar to bracket 400. Bracket 400 may be a single-piece bracket having a receiving aperture 402 defined by a first sidewall 304 and a flange 408 of the bracket 400. A fastener 474 may extend between the first sidewall 304 and tab 270 and through fastening aperture 272, thereby retaining the tab 270 to first sidewall 304.

With respect to FIG. 5A and FIG. 5B, elements with like element numbering, as depicted in FIG. 2A, are intended to be the same and will not necessarily be repeated for the sake of clarity.

With reference to FIG. 5A and FIG. 5B, a bracket 500 is illustrated, in accordance with various embodiments. In various embodiments, bracket 200 of FIG. 2C may be similar to bracket 500. Bracket 500 may be a two-piece bracket, wherein a first piece is defined by a flange 508 and a first sidewall 504 extending from the flange 508 and a second piece is defined by an angle bracket 501. The angle bracket may comprise an angle of between 80 and 100 degrees. Bracket 500 may have a receiving aperture 502 defined by a first sidewall 504 and a flange 508 of bracket 500. Angle bracket may comprise a second sidewall 506 and a base 512. A fastener 574 may extend between the first sidewall 504 and second sidewall 506 and through fastening aperture 272, thereby retaining the tab 270 to bracket 500. Base 512 may be coupled directly to flange 508.

Figure 6B:
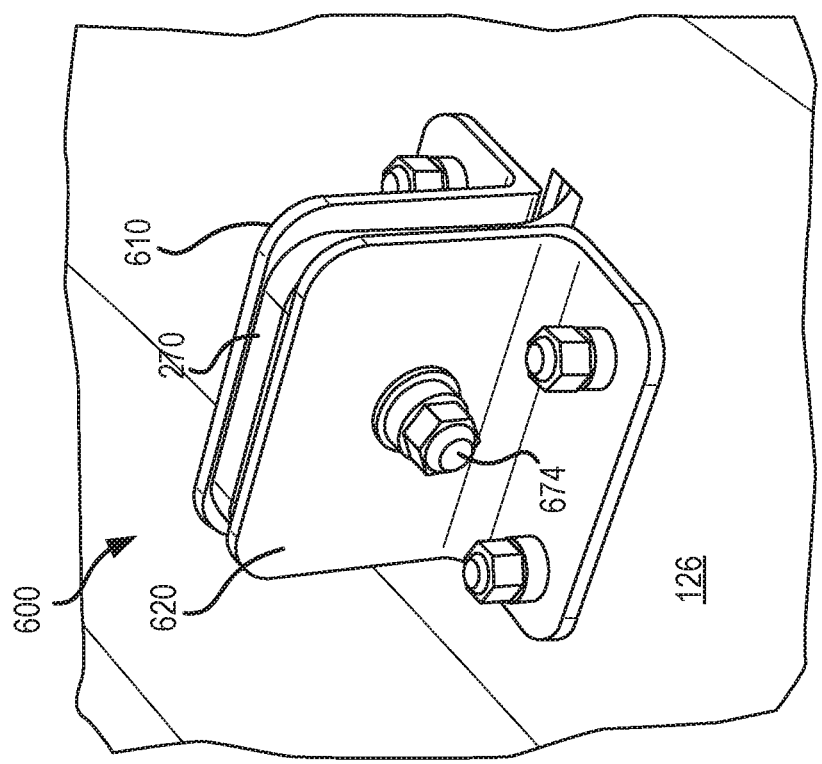
FIG. 6A and FIG. 6B illustrate a two-piece bracket for a vortex-generating arrangement, in accordance with various embodiments.
Figure 6A:
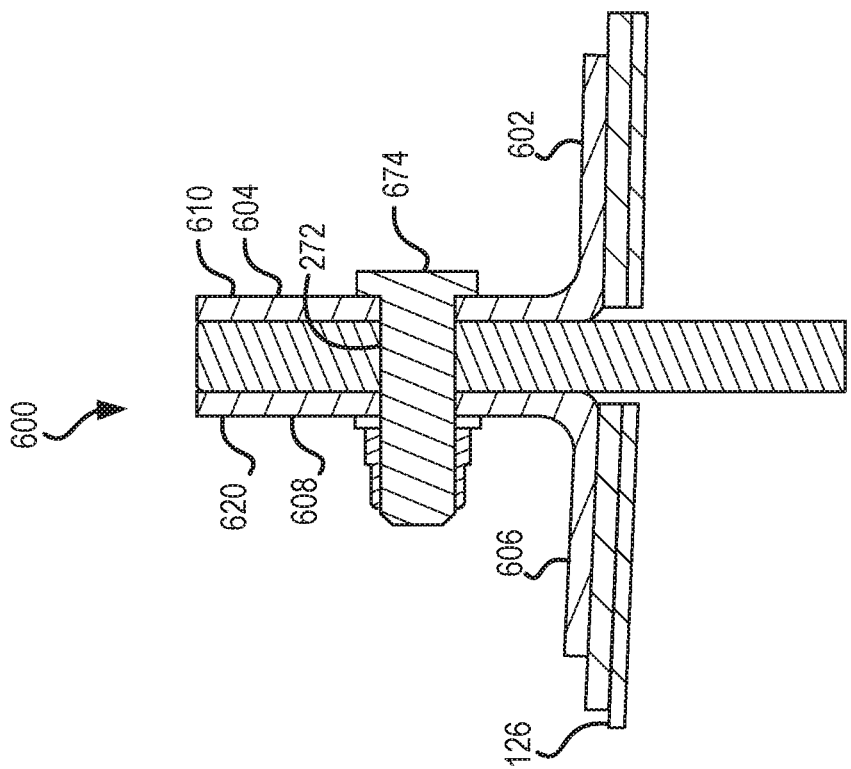

With respect to FIG. 6A and FIG. 6B, elements with like element numbering, as depicted in FIG. 2A, are intended to be the same and will not necessarily be repeated for the sake of clarity.

With reference to FIG. 6A and FIG. 6B, a bracket 600 is illustrated, in accordance with various embodiments. In various embodiments, bracket 200 of FIG. 2C may be similar to bracket 600. Bracket 600 may be a two-piece bracket, wherein a first piece comprises a first angle bracket 610 having a base 602 and a first sidewall 604 and a second piece comprises a second angle bracket 620 having a base 606 and a second sidewall 608. The first angle bracket 610 and the second angle bracket 620 may be coupled to inner surface 126 via base 602 and base 606, respectively. Tab 270 may be disposed between first angle bracket 610 and second angle bracket 620.

With respect to FIG. 7A and FIG. 7B, elements with like element numbering, as depicted in FIG. 2C, are intended to be the same and will not necessarily be repeated for the sake of clarity.

With reference to FIG. 7A and FIG. 7B, a tab 270 is illustrated having a fastening aperture 772 having a geometry which is complementary to the geometry of fastener 274. In various embodiments, fastening aperture 272 of FIG. 2A may be similar to fastening aperture 772. For example, the geometry of the outer surface of fastener 274 may be substantially equal to the geometry of fastening aperture 772. In this regard, fastener 274 may be prevented from moving in the X-direction via fastening aperture 772.

With respect to FIG. 8A and FIG. 8B, elements with like element numbering, as depicted in FIG. 2C, are intended to be the same and will not necessarily be repeated for the sake of clarity.

With reference to FIG. 8A and FIG. 8B, a tab 270 is illustrated having a slotted fastening aperture 872. In various embodiments, fastening aperture 272 of FIG. 2A may be similar to slotted fastening aperture 872. Fastener 274 may be allowed to move relative to tab 270 along the X-direction, for example in response to thermal expansion of strake 160, with momentary reference to FIG. 2A. In this regard, with combined reference to FIG. 2A, FIG. 7A, and FIG. 8A, a first tab 270, such as tab 270A for example, may comprise fastening aperture 772, and a second tab 270, such as tab 270B for example, may comprise slotted fastening aperture 872. In various embodiments, strake 160 may comprise one tab (e.g., first tab 270A) having fastening aperture 772 and the remainder of the tabs 270 may comprise slotted fastening apertures 872. In this manner, strake 160 may be allowed to thermally grow and contract relative to first tab 270A.

With reference to FIG. 9, a method 900 of installing a strake is provided, in accordance with various embodiments. Method 900 includes positioning the strake relative to an aerodynamic surface (step 910). Method 900 includes moving the strake towards the aerodynamic surface (step 920). Method 900 includes positioning a first bracket relative to an inner surface (step 930). Method 900 includes positioning a first fastener to extend from the first bracket through a first fastening aperture disposed in the first tab (step 940). Method 900 includes positioning a second bracket relative to the inner surface (step 950). Method 900 includes positioning a second fastener to extend from the second bracket through a second fastening aperture disposed in the second tab (step 960).

With combined reference to FIG. 2A, FIG. 2B, FIG. 2C, and FIG. 9, step 910 may include positioning strake 160 relative to aerodynamic surface 125, as illustrated in FIG. 2A. Step 920 may include moving strake 160 towards aerodynamic surface 125, as illustrated in FIG. 2B. Step 930 may include positioning a first bracket (e.g., bracket 200) relative to inner surface 126, as illustrated in FIG. 2C. step 940 may include positioning a first fastener (e.g., fastener 274) to extend from the first bracket 200 through a first fastening aperture (e.g., fastening aperture 272) disposed in the first tab (e.g., tab 270). Step 950 may include positioning a second bracket (e.g., bracket 200) relative to inner surface 126. Step 960 may include positioning a second fastener (e.g., fastener 274) to extend from the second bracket through a second fastening aperture (e.g., fastening aperture 272) disposed in the second tab. Method 900 may further include coupling bracket 200 to inner surface 126, for example via plurality of fasteners 278.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A strake, comprising:
   a plate, wherein the plate extends between a forward end and an aft end along a first direction and the plate extends between a root end and a tip end along a second direction;
   a first tab extending from the root end of the plate, wherein a first fastening aperture is disposed in the first tab; and
   a second tab extending from the root end of the plate, wherein a second fastening aperture is disposed in the second tab,
   wherein the plate comprises a thickness, measured along a third direction;
   the first direction is orthogonal to the second direction and the third direction is orthogonal to the second direction;
   the first tab extends in the second direction and the second tab extends in the second direction; and
   a first centerline of the first fastening aperture extends in the third direction and a second centerline of the second fastening aperture extends in the third direction.

2. The strake of claim 1, wherein the strake is tapered from the aft end towards the forward end.

3. The strake of claim 2, wherein a planar surface extends between the forward end, the aft end, the root end, and the tip end.

4. The strake of claim 3, wherein the second fastening aperture comprises a slotted fastening aperture configured to allow a fastener to move relative to the first fastening aperture.

5. A vortex-generating arrangement, comprising:
an aerodynamic surface;
an inner surface disposed inward from the aerodynamic surface;
a first slot disposed in the aerodynamic surface and extending between the aerodynamic surface and the inner surface;
a second slot disposed in the aerodynamic surface and extending between the aerodynamic surface and the inner surface;
a first bracket coupled to the inner surface;
a second bracket coupled to the inner surface;
a strake, comprising:
    a first tab extending through the first slot, the first tab is retained within the first slot via the first bracket;
    a second tab extending through the second slot, the second tab is retained within the second slot via the second bracket; and
    a plate,
    wherein the first tab extends from the plate and a first fastening aperture is disposed in the first tab, and the second tab extends from the plate and a second fastening aperture is disposed in the second tab.

6. The vortex-generating arrangement of claim 5, wherein:
the plate extends between a forward end and an aft end along a first direction;
the plate extends between a root end and a tip end along a second direction; and
the plate comprises a thickness, measured along a third direction.

7. The vortex-generating arrangement of claim 6, wherein the first direction is orthogonal to the second direction and the third direction is orthogonal to the second direction.

8. The vortex-generating arrangement of claim 7, wherein the first tab extends in the second direction and the second tab extends in the second direction.

9. The vortex-generating arrangement of claim 8, wherein a first centerline of the first fastening aperture extends in the third direction and a second centerline of the second fastening aperture extends in the third direction.

10. The vortex-generating arrangement of claim 6, further comprising:
a first fastener extending from the first bracket and through the first fastening aperture; and
a second fastener extending from the second bracket and through the second fastening aperture.

11. The vortex-generating arrangement of claim 10, wherein a planar surface extends between the forward end, the aft end, the root end, and the tip end.

12. The vortex-generating arrangement of claim 11, wherein the second fastening aperture comprises a slotted fastening aperture configured to allow a fastener to move relative to the first fastening aperture.

13. A method of installing a strake, comprising:
positioning the strake relative to an aerodynamic surface, wherein the strake comprises:
    a plate;
    a first tab extending from the plate and a first fastening aperture is disposed in the first tab; and
    a second tab extending from the plate and a second fastening aperture is disposed in the second tab;
moving the strake towards the aerodynamic surface, wherein the first tab and the second tab of the strake are inserted into and extend through a first slot and a second slot respectively, disposed in the aerodynamic surface in response to the moving;
positioning a first bracket relative to an inner surface;
positioning a first fastener to extend from the first bracket through the first fastening aperture disposed in the first tab, wherein the first tab is retained within the first slot via the first bracket;
positioning a second bracket relative to the inner surface; and
positioning a second fastener to extend from the second bracket through the second fastening aperture disposed in the second tab, wherein the second tab is retained within the second slot via the second bracket.

14. The method of claim 13, further comprising coupling the first bracket to the inner surface.

* * * * *